United States Patent [19]

Dreer

[11] 4,012,231
[45] Mar. 15, 1977

[54] PROCESS FOR THE MANUFACTURE OF FILLERS FROM SOLID WASTE

[76] Inventor: Gottfried Dreer, 43 Jrawehlstrasse, Essen, Germany, 4300

[22] Filed: Feb. 18, 1975

[21] Appl. No.: 550,585

[30] Foreign Application Priority Data

Feb. 15, 1974  Germany .......................... 2407383

[52] U.S. Cl. ........................... 106/288 B; 106/309; 106/117; 106/97; 106/15 FP
[51] Int. Cl.² ......................................... C04B 31/40
[58] Field of Search ............... 106/288 B, 309, 117, 106/97, 15 FP; 71/11, 12, 14; 241/24, 25

[56] References Cited

UNITED STATES PATENTS

| | | | |
|---|---|---|---|
| 2,924,532 | 9/1960 | Dereich | 106/15 FP |
| 3,734,988 | 5/1973 | Antablian | 106/97 |
| 3,892,667 | 7/1975 | Towal | 106/15 FP |

*Primary Examiner*—Winston A. Douglas
*Assistant Examiner*—J. V. Howard
*Attorney, Agent, or Firm*—Burton, Parker & Schramm

[57] ABSTRACT

Described is a process for the production of fillers from solid waste which is first ground, magnetically freed from iron particles, supplied with sewage sludge or water, fractionated into portions of different size and treated in a fermentation process for about 24 hours at 65° C while air is continuously fed such that while the compost is being fermented, added thereto is a solvent in a range of 1 to 2–4 parts by weight, compost to solvent, said treatment continuing for ten to sixteen hours, dried, and to the dried product, chlorinated paraffin and antimony trioxide are added thereto.

4 Claims, No Drawings

PROCESS FOR THE MANUFACTURE OF FILLERS FROM SOLID WASTE

DESCRIPTION OF THE INVENTION

The invention concerns a process for the production of fillers from solid waste which for conversion into compost, is first ground, magnetically freed from iron particles, supplied with sewage sludge or water, fractionated into portions of different size, and treated in a fermentation process conducted for about 24 hours at a temperature of about 65° C while fresh air is continuously fed.

The incorporation of ground solid wastes into cement-like masses has been known for a long time, especially since many waste products of the customary industrial materials, for example, wood, rubber, glass, fibers produced in the textile industry, or the like can be worked into the composite cement system.

However, untreated household solid waste or the compost produced according to the above-mentioned method cannot be processed to yield molded articles of all types, such as slabs and walls for exterior- and interior construction, floors, roofs, or the like since the many contaminants present in the solid waste or in the compost cause difficulties in the progress of the necessary polymerization process. These difficulties essentially consist in hindering or preventing molecular cross-linking and thus, the hardening of the resins to form homogeneous, solid bodies.

The invention has as its object a process for manufacturing fillers from solid waste of the above-described kind, which process produces fillers that can be incorporated into natural or synthetic resins for the manufacture of plastics without difficulties whereby the polymerization process is not impeded.

According to the invention, the task of the invention is accomplished in that the compost being formed and a solvent are alternately or together introduced into a first heatable tank in the ratio of 1 : 2 to 1 : 4 and are therein stirred from the start to the end of the introduction of a batch, followed by being kept in the tank about 10 to 16 hours for ripening and that after a certain depth of color has been reached, and the content of the tank has been heated to dryness corresponding to the vaporization point of the solvent, the dried content of the tank is transferred to a second tank in which it is mixed for about three minutes with 2 – 3% chlorinated paraffin and 1 – 3% antimony trioxide, based on the weight of the content of the tank, while being stirred and heated anew until dryness is reached again.

Carrying out the process of the invention, one obtains the fillers in form of fibers or granules which show the properties desired for fulfilling the task of the invention. Moreover, the fillers possess the following advantages: they are noncombustible, water-repellent, resistant to mold formation, resistant to many acids, mineral oils, low-boiling petroleum distillates, they are stable at temperatures up to 1200° C, unaffected by abrupt temperature changes, resistant to cold, sound-absorbing, insulating with respect to transfer of heat and electricity, and they readily polymerize. In addition, they possess a high filling capacity, i.e., considerable quantities of such fillers can be incorporated into a given quantity of resin.

Solvents which can be used are carbon tetrachloride, trichloroethylene, ketones (acetone), ether, styrene, xylene, hydrogen peroxide, aromatic hydrocarbons, and alcohols, either by themselves or mixed.

Resins which are filled with the fibrous or granular fillers according to the invention can be processed to molded articles of all types. The following list merely cites examples and is not to be regarded as limiting.

Walls and slabs for exterior- and interior construction;
floors;
furniture;
sound-absorbing masses;
laminated construction elements;
linoleum-like materials;
coating compositions (when the fillers have small grain sizes);
adhesives (because of the protein content of the fillers).

Furthermore, the fillers according to the invention can be also used in order that resins which are relatively hard originally are made more elastic (so-called elastification).

The choice of solvents depends upon the physical and chemical data of the end product to be manufactured. The following is an example for the manufacture of such a filler:

Three parts by weight of compost and five parts by weight of styrene are introduced into the first heatable tank. As soon as the total batch has been introduced, the heating and stirring is switched off. The following time for ripening amounted to about 10 – 12 hours. As soon as a light-brown color of the mass has been reached, one admixes chlorinated paraffin and antimony trioxide while stirring and further heating. Thereby, the temperature is increased by 100° C within about 15 minutes.

Admixed are two percent by weight of chlorinated paraffin and three percent by weight of antimony trioxide.

In order to use the thus obtained filler for manufacturing, for example, a non-combustible slab to be placed on the exterior surface of the front of a building, one mixes the filler with a synthetic resin in the ratio of 60 : 30 by weight and adds as well hardeners and accelerators, followed by casting or molding.

I claim:

1. A process for the production of fillers from solid waste which for conversion into compost, is first ground, magnetically freed from iron particles, supplied with sewage sludge or water, fractionated into portions of different size and treated in a fermentation process for about 24 hours at 65° C while fresh air is continuously fed, the improvement comprising forming a mixture of the compost and a solvent in a first heatable tank at a ratio of 1:2–4 parts by weight of compost:solvent and stirring said mixture from the start to the end of the introduction of the components therein; maintaining the contents in the first tank for a period of time ranging from about 10 to 16 hours; heating to dryness the contents of the first heatable tank; transferring the contents of the first heatable tank to a second tank; adding to said second tank about 2–3 percent of chlorinated paraffin and about 1–3 percent antimony trioxide; mixing the contents in said second tank; and heating the contents of the second tank until dryness is reached.

2. The process of claim 1 wherein the solvent is selected from the group consisting of carbon tetrachloride, trichloroethylene, a ketone, ether, styrene, xylene, hydrogen peroxide, an aromatic hydrocarbon, an alcohol and mixtures thereof.

3. The process of claim 1, characterized in that three parts by weight of compost and five parts by weight of styrene are introduced into the first heatable tank, and stirred, and that after a time for fermenting of about 10 to 12 hours has been allowed, while stirring and heating are switched off and after a light-brown color has been attained, stirring is resumed, and the temperature is increased by 100° C within about 15 minutes.

4. Process for the manufacture of a non-combustible slab to be placed on the exterior surface of the front of a building whereby the filler prepared according to claim 3 is used, characterized in that the filler is mixed with a synthetic resin in the ratio of 60 : 30 by weight and hardeners and accelerators are added, followed by casting or molding.

* * * * *